United States Patent
Le Cloarec et al.

(10) Patent No.: US 12,005,666 B2
(45) Date of Patent: Jun. 11, 2024

(54) METHOD FOR CALCULATING THE THICKNESS OF THE TRAILING AND LEADING EDGES ON A BLADE PROFILE

(71) Applicants: SAFRAN AERO COMPOSITE, Paris (FR); SAFRAN AIRCRAFT ENGINES, Paris (FR); SAFRAN AEROSPACE COMPOSITES, Rochester, NH (US)

(72) Inventors: Damien Vincent Le Cloarec, Moissy-Cramayel (FR); Clement Giacovelli, Moissy-Cramayel (FR); Jeffrey Steven Sherman, Moissy-Cramayel (FR); Mickaelle Lucie Alicia Thomas, Moissy-Cramayel (FR)

(73) Assignees: SAFRAN AERO COMPOSITE, Paris (FR); SAFRAN AIRCRAFT ENGINES, Paris (FR); SAFRAN AEROSPACE COMPOSITES, Rochester, NH (US)

( * ) Notice: Subject to any disclaimer, the term of this patent is extended or adjusted under 35 U.S.C. 154(b) by 237 days.

(21) Appl. No.: 17/634,716

(22) PCT Filed: Aug. 7, 2020

(86) PCT No.: PCT/FR2020/051450
§ 371 (c)(1),
(2) Date: Feb. 11, 2022

(87) PCT Pub. No.: WO2021/028637
PCT Pub. Date: Feb. 18, 2021

(65) Prior Publication Data
US 2022/0281198 A1  Sep. 8, 2022

Related U.S. Application Data

(60) Provisional application No. 62/886,227, filed on Aug. 13, 2019.

(51) Int. Cl.
B23P 15/02 (2006.01)
B29D 99/00 (2010.01)
(Continued)

(52) U.S. Cl.
CPC .......... B29D 99/0025 (2013.01); B23P 15/02 (2013.01); G05D 5/02 (2013.01);
(Continued)

(58) Field of Classification Search
CPC ............... B23P 15/02; Y10T 29/49336; Y10T 29/49771; F05D 2230/18; B29D 99/0025; F01D 5/141; F01D 5/147
See application file for complete search history.

(56) References Cited

U.S. PATENT DOCUMENTS

| | | | |
|---|---|---|---|
| 4,908,782 | A | 3/1990 | Pekarek et al. |
| 2007/0025855 | A1 | 2/2007 | Bouron et al. |

(Continued)

FOREIGN PATENT DOCUMENTS

| | | |
|---|---|---|
| EP | 0 126 576 A2 | 11/1984 |
| EP | 0 126 576 A3 | 11/1984 |

(Continued)

OTHER PUBLICATIONS

International Search Report dated Nov. 6, 2020 in PCT/FR2020/051450 filed on Aug. 7, 2020 (2 pages).

*Primary Examiner* — Jermie E Cozart
(74) *Attorney, Agent, or Firm* — Oblon, McClelland, Maier & Neustadt, L.L.P.

(57) ABSTRACT

A verification method for verifying whether the aerodynamic profile of a real blade for an aircraft turbine engine complies with a theoretical blade, the method including constructing a camber line of the theoretical blade and constructing a camber line of the real blade; constructing a relationship for the thickness of the theoretical blade and
(Continued)

constructing a relationship for the thickness of the real blade, the thickness relationship of a blade corresponding to the curve plotting the thickness of the blade as a function of curvilinear length along the camber line from a leading edge of the blade to a trailing edge of the blade, where thickness is the dimension of the blade extending perpendicularly to the camber line at each point of the camber line; superposing the thickness relationship of the real blade on the thickness relationship of the theoretical blade; and extracting the leading-edge and trailing edge thicknesses.

2 Claims, 3 Drawing Sheets

(51) Int. Cl.
*G05D 5/02* (2006.01)
*F01D 5/14* (2006.01)

(52) U.S. Cl.
CPC .......... *F01D 5/141* (2013.01); *F05D 2230/18* (2013.01); *Y10T 29/49336* (2015.01); *Y10T 29/49771* (2015.01)

(56) References Cited

U.S. PATENT DOCUMENTS

2014/0373503 A1 12/2014 Hanlon
2015/0209883 A1* 7/2015 Hamada .................. B23H 9/14
219/69.17

FOREIGN PATENT DOCUMENTS

EP 1 749 969 A1 2/2007
EP 2 816 430 A1 12/2014

* cited by examiner

METHOD FOR CALCULATING THE THICKNESS OF THE TRAILING AND LEADING EDGES ON A BLADE PROFILE

BACKGROUND OF THE INVENTION

The invention relates to verifying whether a blade or a vane complies with an aerodynamic profile, in particular a blade or a vane for an aircraft turbine engine.

A bladed rotor wheel defines an axial direction forming the axis of rotation of the rotor wheel and a radial direction along which the blades of the rotor wheel extend. In the context of verifying that fan blades are in compliance, it is common practice to verify a plurality of thicknesses over different sections of the blade, with the sections being taken by way of example in planes that are orthogonal to the radial direction of each blade. At each of the various sections of a blade, the following thicknesses are verified: the thickness $E_F$ at the trailing edge, the maximum thickness $E_M$ of the part, and the thickness $E_A$ at the leading edge; this is shown in FIG. 1, which is a section view of a blade 1 on a plane containing a direction that extends from the leading edge 2 to the trailing edge 3 of the blade 1 and that is orthogonal to the direction extending between the blade root and the blade tip, i.e. the radial direction of a rotor wheel on which the blade 1 is mounted.

In general, the thicknesses of the leading edge and of the trailing edge are constructed respectively from a leading-edge point and from a trailing-edge point that are situated respectively at a certain distance from the end 20 of the leading edge 2 or from the end 30 of the trailing edge 3. The term "end" 20 is used of the leading edge 2 to mean the portion of the blade 1 that is furthest upstream along the axial direction $D_A$ in the direction of the flow going from the leading edge 2 towards the trailing edge 3. The term "end" 30 is used of the trailing edge 3 to mean the portion of the blade 1 that is furthest downstream along the axial direction $D_A$ in the direction of the flow going from the leading edge 2 towards the trailing edge 3.

On an unfinished part, and depending on the method of fabricating the profile, extra lengths $S_2$ and $S_3$, i.e. excess material, may be present respectively on the leading edge 2 and on the trailing edge 3; this is shown in FIG. 2, which shows the profile of the unfinished part as a continuous line and the profile of the finished part as a dashed line. These zones are zones $Z_C$ where material is cropped, they are not functional and they are removed during machining. These zones extending over the concave and convex portions of the blade 1 between the leading edge and the trailing edge of the finished part are zones that are said to be useful zones $Z_U$.

Under such circumstances, the thicknesses of the leading edge 2 and of the trailing edge 3 are constructed while taking account of the extra lengths $S_2$ and $S_3$, but the extra length values used are theoretical values.

By way of example, consideration may be given to the situation in which there is a functional need for the finished profile to have a leading edge thickness $E_A$ and a trailing edge thickness $E_F$ respectively at a leading-edge point that is situated at 10 mm from the end 20 of the leading edge 2 and at a trailing-edge point that is situated at 10 mm from the end 30 of the trailing edge 3, as shown in FIG. 1.

The term "functional need" involves both the mechanical strength and the aerodynamic performance of the profile: too little thickness may give rise to a lack of mechanical strength for the part, and excessive thicknesses of material reduce efficiency.

On the profile of the unfinished part shown in FIG. 2, the fabrication extra lengths $S_2$ and $S_3$ are at 15 mm from each of the ends 200 and 300 in the unfinished state. The ends 200 and 300 of the leading edge 2 and of the trailing edge 3 of the unfinished part are different from the ends 20 and 30 of the leading edge 2 and of the trailing edge 3 of the finished part. In other words, the end 200 of the leading edge 2 of the unfinished part is 15 mm away from the end 20 of the leading edge 2 of the finished part. Likewise, the end 300 of the trailing edge 3 of the unfinished part is 15 mm away from the end 30 of the trailing edge 3 of the finished part.

Consequently, the thicknesses $E_A$ and $E_F$ of the leading edge and of the trailing edge are therefore measured on the unfinished part at 25 mm from the corresponding ends 200 and 300, taking account of the distance of 10 mm for measuring thickness on the finished part when verifying the thicknesses $E_A$ and $E_F$ obtained on the finished part.

The technical problem that is encountered lies in the large amount of variability in the real extra lengths on the unfinished part compared with their theoretical lengths. There may be variations of several millimeters from one part to another in this zone that is to be cropped.

Given the method of constructing the thicknesses $E_A$ and $E_F$ of the leading edge and of the trailing edge, a large amount of variation in the position of the trailing edge point or of the leading edge point on the real unfinished profile as compared with a theoretical unfinished profile leads to the trailing edge point and of the leading-edge point being shifted, and thus to an error in measuring the leading edge and trailing edge thicknesses $E_A$ and $E_F$ on the profile.

In the example shown in FIG. 3, the real unfinished profile, which is drawn as a continuous line, can be superposed relatively well on the theoretical unfinished profile, which is drawn as a chain-dotted line, in both the concave and the convex useful zones, and the leading-edge, trailing-edge, and maximum thicknesses $E_A$, $E_F$, and $E_M$ are relatively accurate. Nevertheless, because of excessive extra length at each of the two ends 200 and 300 of the leading and trailing edges 2 and 3, the leading-edge and trailing-edge thicknesses $E_A$ and $E_F$ as measured are relatively different from the corresponding theoretical thicknesses $E_{AT}$ and $E_{FT}$. Consequently, the part will be found to be out of compliance, even though it is not.

OBJECT AND SUMMARY OF THE INVENTION

The invention seeks to mitigate the above-mentioned drawbacks and to avoid the above-mentioned difficulties by proposing a method of verifying whether the aerodynamic profile of a blade of an aircraft turbine engine is in compliance while measuring only the useful zones of the parts that are to form the blades, i.e. only the functional zones, in particular in order to reduce the time required for checking the shape of the parts so as to improve efficiency in fabricating a blade.

The invention provides a verification method for verifying whether the aerodynamic profile of a real blade for an aircraft turbine engine complies with a theoretical blade, the method comprising:

for a plurality of sections of the blade, determining a thickness of the real blade and a thickness of the corresponding theoretical blade at a plurality of points along a camber line of the corresponding blade, where thickness is the dimension of the blade extending perpendicularly to the camber line at each point of the camber line;

comparing the thickness of the real blade with the thickness of the theoretical blade for each point of the camber line of each section; and determining whether the aerodynamic profile of the real blade is in compliance from the result of the comparison of each point of the camber line of each section of the blade.

According to a general characteristic of the invention, for each section, a thickness of the real blade and a thickness of the corresponding theoretical blade for a plurality of points along a camber line of the corresponding blade are determined by:

constructing a camber line of the theoretical blade and constructing a camber line of the real blade;

constructing a relationship for the thickness of the theoretical blade and constructing a relationship for the thickness of the real blade, the thickness relationship of a blade corresponding to the curve plotting the thickness of the blade as a function of curvilinear length along the camber line from a leading edge of the blade to a trailing edge of the blade, preferably in the flow direction;

superposing the thickness relationship of the real blade on the thickness relationship of the theoretical blade; and extracting the leading-edge and trailing-edge thicknesses of the blade section.

The method of the invention thus makes it possible to reduce the time required for inspecting the shapes of parts by relying solely on the useful zones of the parts that are to form the blades. The method is thus faster than the above-mentioned prior art method, which includes acquiring zones that are to be cropped from the unfinished parts. The method of the invention does not involve taking references relative to the leading and trailing edges of the parts.

In a first aspect of the verification method for verifying whether the aerodynamic profile of a real blade for an aircraft turbine engine complies with a theoretical blade, the thickness relationship of the real blade and the thickness relationship of the theoretical blade may be superposed by using a least-squares superposition function.

The least-squares function corresponds to optimizing minimizing the sum of the differences between the thicknesses of the real blade and of the theoretical blade as squares of the difference between the real thickness relationship minus the theoretical thickness relationship, i.e. using the following equation:

$$S(x) = \min \Sigma \text{Real Thickness}_X - \text{Theoritical Thickness}_X$$

Where "Real Thickness$_x$" is the thickness of the real blade at a position x along the camber line of the real blade, "Theoretical Thickness$_x$" is the thickness of the theoretical blade at the same position x along the camber line of the theoretical blade, "min" is the minimum function, and S(x) is the difference for each position x along the camber line.

In a second aspect of the verification method for verifying whether the aerodynamic profile of a real blade for an aircraft turbine engine complies with a theoretical blade, the leading-edge and the trailing-edge thicknesses of the real blade may be extracted by determining the values on the thickness relationship of the real blade that correspond respectively to the predetermined positions of a leading edge point and of a trailing edge point on the theoretical blade.

The camber line for a theoretical or real blade may be constructed in various ways, such as for example the bitangent-circle method or the mean curve method. In the so-called "bitangent-circle" method, the circles are bitangent to the curves of the pressure side and of the suction side. For each circle created in this way, the center is recovered. The camber line is generated by advancing with a step size that is sufficiently small. The mean curve method consists in having the point of symmetry between the points on the pressure side profile and on the suction side profile.

The thickness relationship for the theoretical blade is constructed from data obtained from a database relating to the desired blade profile. In contrast, the thickness relationship for the real blade may be constructed by considering the thickness of the real profile as measured in a direction perpendicular to the camber line at each curvilinear distance along the camber line.

Another possible method for constructing the thickness relationship of the real blade is to construct a circle that is bitangent to the pressure side and suction side curves, which circle has its center lying on the camber line, thereby constructing the thickness relationship as being the diameter of the bitangent circle as a function of the curvilinear distance of its center along the camber line.

The invention also proposes a method of fabricating a blade for an aircraft turbine engine, the method comprising molding a real blade, performing a verification method as defined above for verifying whether the aerodynamic profile of the real blade complies with a theoretical blade, and machining the real blade if the blade is considered as being in compliance at the end of said verification method.

BRIEF DESCRIPTION OF THE DRAWINGS

The invention can be better understood by reading the following description, given by way of nonlimiting indication and with reference to the accompanying drawings, in which.

DETAILED DESCRIPTION OF IMPLEMENTATIONS

Figure 1:
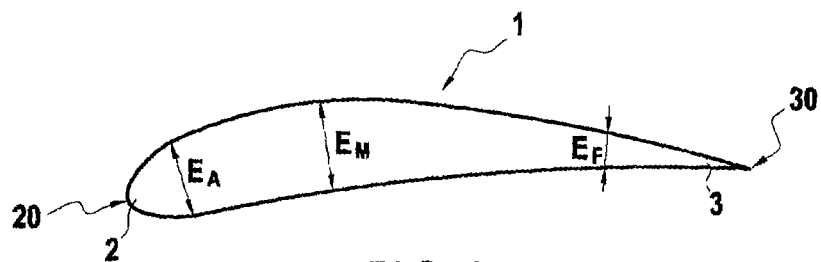
FIG. 1 is a section view of a prior art blade on a plane containing a direction extending from the leading edge to the trailing edge of the blade and orthogonal to the direction extending between the blade root and the blade tip.
Figure 2:
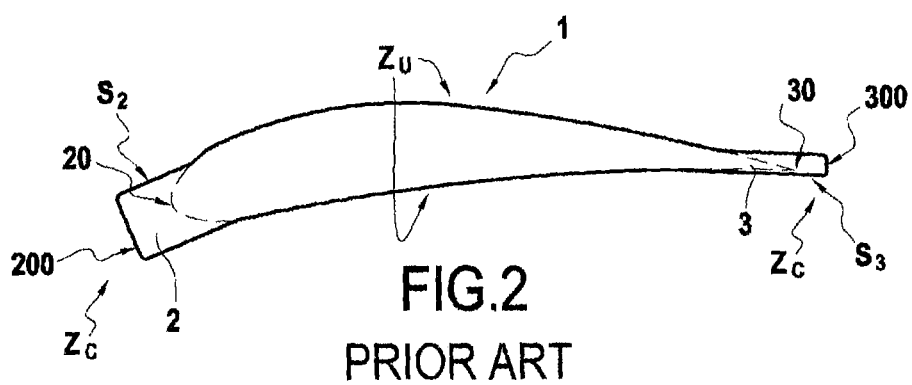
FIG. 2 is a section view of a theoretical unfinished part prior to machining the prior art blade.
Figure 3:
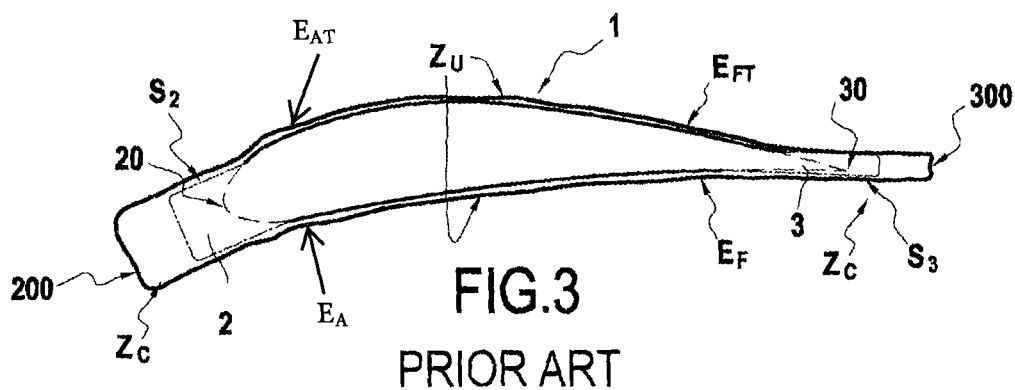
FIG. 3 is a section view showing a real unfinished part superposed on a theoretical unfinished part prior to machining the prior art blade.
Figure 4:
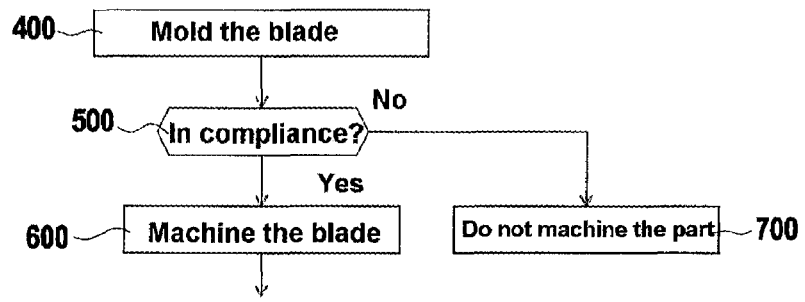
FIG. 4 is a flowchart of a fabrication method for fabricating a blade in an implementation of the invention.

FIG. 4 is a flowchart of a fabrication method for fabricating a blade in an implementation of the invention.

In the implementation shown in FIG. 4, the fabrication method includes a first step 400 of molding a real blade. At the end of molding, the resulting unfinished part is unmolded in order to be subjected to a step 500 of verifying whether it is in compliance, prior to a possible step 600 of machining it if the unfinished part is considered as being in compliance at the end of the method in step 500 of verifying compliance. If the unfinished part is considered not to be in compliance at the end of the compliance verification method of step 500, the blade is not machined (step 700).

Figure 5:
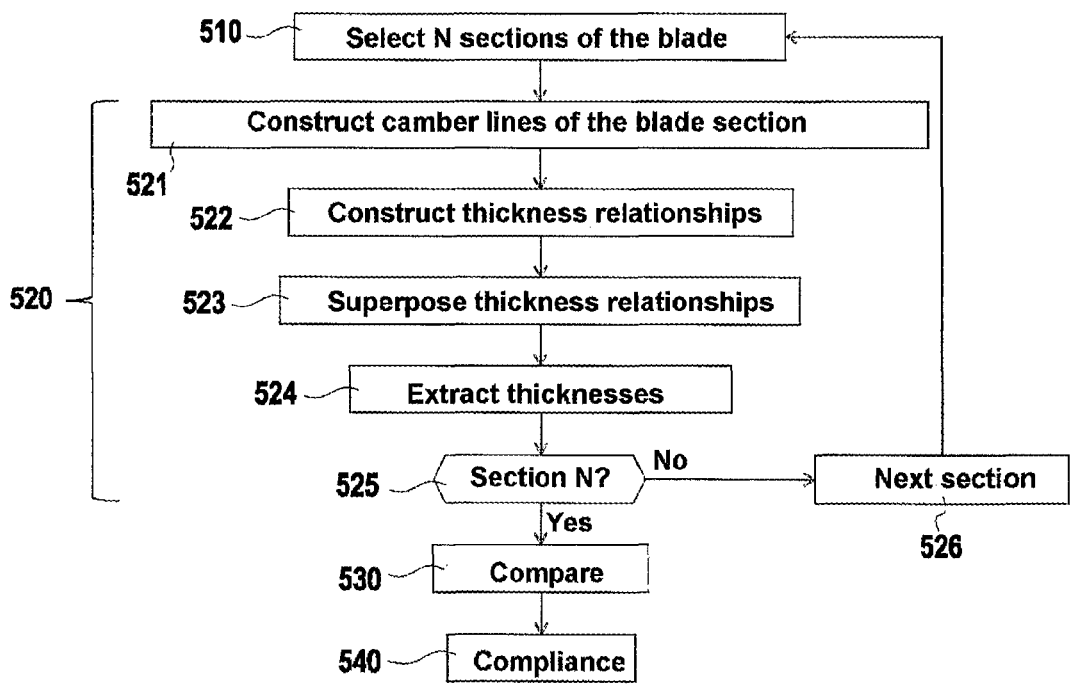
FIG. 5 is a flowchart of a method of verifying the compliance of the aerodynamic profile of a real blade for an aircraft turbine engine compared with a theoretical blade in an implementation of the invention.

FIG. 5 is a flowchart in an implementation of the invention showing the method of verifying compliance of the aerodynamic profile of a real blade for an aircraft turbine engine compared with a theoretical blade as performed in the step 500 of the fabrication method shown in FIG. 4.

In a first step 510, the method of verifying compliance of the aerodynamic profile comprises selecting N sections of the unmolded unfinished part that is to be machined into a blade.

In a following step 520, a real thickness of the blade is determined for each of the N blade sections and a corresponding theoretical blade thickness is determined for the corresponding theoretical blade section at a plurality of points along a camber line of the corresponding blade. Thickness corresponds to the dimension of the blade that extends perpendicularly to the camber line at each point of the camber line.

In order to perform the determination of step 520, there are constructed initially in a step 521 both a camber line of the theoretical blade and a camber line of the real blade for the corresponding blade section.

Thereafter, in a following step 522, a relationship is constructed for the thickness of the theoretical blade and a relationship is constructed for the thickness of the real blade, where the thickness relationship of a blade corresponds to the curve plotting the thickness of the blade as a function of curvilinear length along the camber line from a leading edge of the blade to a trailing edge of the blade.

Thereafter, in a step 523, the thickness relationship for the real blade is superposed on the thickness relationship for the theoretical blade by using a least-squares function.

Figure 6:
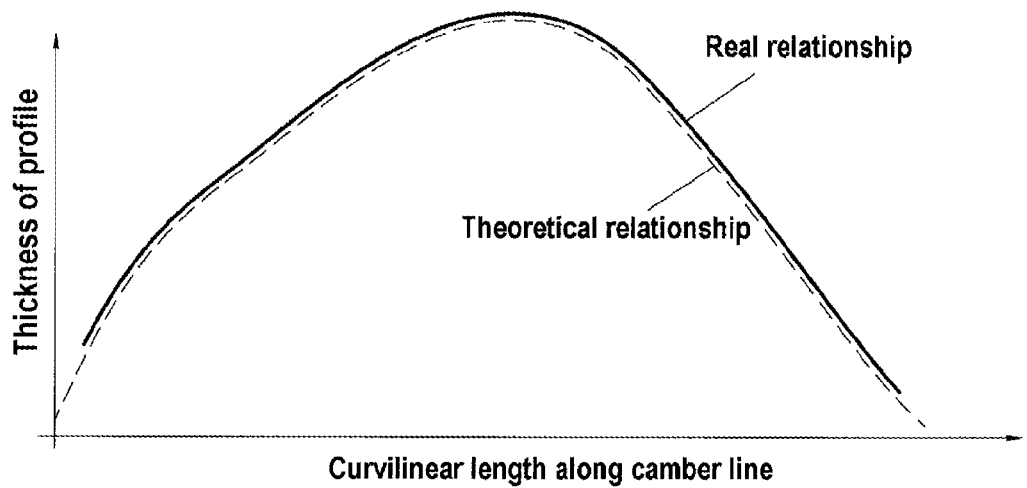
FIG. 6 is a graph plotting a thickness curve as a function of the curvilinear length of the camber line for the real blade and for the theoretical blade after they have been superposed using a least-squares function.

Finally, in a step 524, the leading edge and trailing edge thicknesses of the blade section are extracted by determining the values on the thickness relationship for the real blade that correspond respectively to the predetermined positions of a leading-edge point and of a trailing-edge point of the theoretical blade as shown in FIG. 6, which is a graph plotting a thickness curve as a function of the curvilinear length along the camber line for the real blade as a continuous line and for the theoretical blade as a dashed line is obtained at the end of the step 523 of superposing by using a least-squares function.

Figure 7:
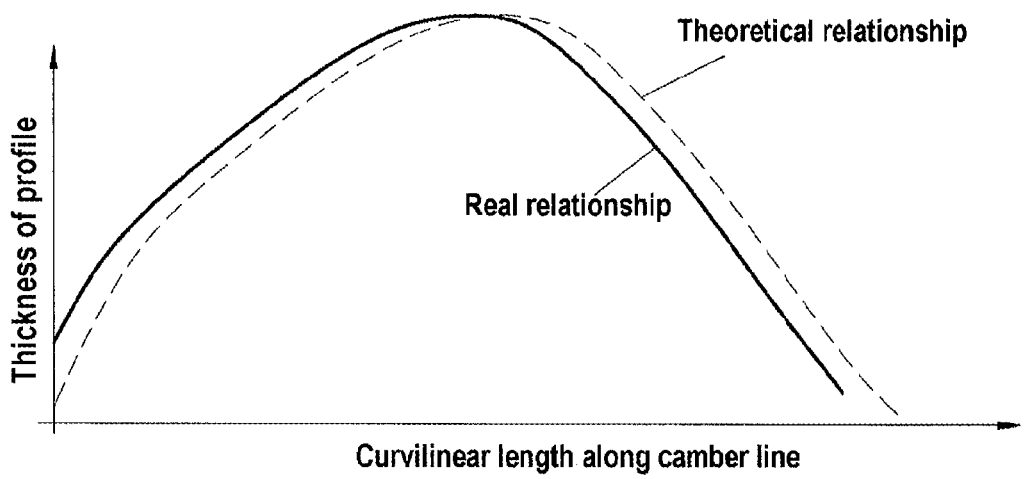
FIG. 7 is a graph plotting a thickness curve as a function of the curvilinear length of the camber line for the real blade and for the theoretical blade before they have been superposed using a least-squares function.

FIG. 7 is a graph using a continuous line to plot a thickness curve as a function of curvilinear length along the camber line for the real blade and using for the theoretical blade a dashed line before they have been superposed in step 523 using a least-squares function.

In a following step 525, it is verified whether the thicknesses had been determined for all of the sections of the blade. If not, the method moves on to the following section in a step 526 and steps 521 to 525 are repeated.

In contrast, if thicknesses have been determined for all of the sections of the blade, then in a step 530, the thickness of the real blade is compared with the thickness of the theoretical blade for each point of the camber line of each section.

In a following step 540, it is finally determined whether the aerodynamic profile of the real blade complies with the theoretical profile on the basis of the results of comparing each point of the camber line of each section of the blade as determined in the preceding step 530. In other words, it is determined whether the difference between the real profile and the theoretical profile lies within an acceptable tolerance range in the definition of the part for determining that it is in compliance.

The invention thus proposes a method of fabricating a blade that includes a method of verifying compliance of the aerodynamic profile of an aircraft turbine engine blade while measuring only useful zones of the parts that are to form the blades, i.e. only functional zones. The method of the invention thus makes it possible to reduce the time required for inspecting the shapes of parts by relying solely on the useful zones of parts that are to form the blades. The method is thus faster than the above-mentioned prior art method that includes acquiring zones that are to be cropped from the unfinished parts. The method of the invention does not involve taking any references relative to the leading and trailing edges of the parts.

The invention claimed is:

1. A verification method for verifying whether the aerodynamic profile of a real blade for an aircraft turbine engine complies with a theoretical blade, the method comprising:

for a plurality of sections of the real blade, determining a thickness of the real blade and a thickness of the corresponding theoretical blade at a plurality of points along a camber line of the corresponding blade, where thickness is the dimension of the blade extending perpendicularly to the camber line at each point of the camber line;

comparing the thickness of the real blade with the thickness of the theoretical blade for each point of the camber line of each section; and determining whether the aerodynamic profile of the real blade is in compliance from the result of the comparison of each point of the camber line of each section of the real blade with the theoretical blade;

wherein, for each section, a thickness of the real blade and a thickness of the corresponding theoretical blade for a plurality of points along a camber line of the corresponding blade are determined by:

constructing a camber line of the theoretical blade and constructing a camber line of the real blade;

constructing a relationship for the thickness of the theoretical blade and constructing a relationship for the thickness of the real blade, the thickness relationship of a blade corresponding to the curve plotting the thickness of the blade as a function of curvilinear length along the camber line from a leading edge of the blade to a trailing edge of the blade;

superposing the thickness relationship of the real blade on the thickness relationship of the theoretical blade by using a least-squares superposition function; and extracting the leading-edge and trailing-edge thicknesses of the real blade at the blade section, the leading-edge and the trailing-edge thicknesses of the real blade being extracted by determining the values on the thickness relationship of the real blade that correspond respectively to the predetermined positions of a leading edge point and of a trailing edge point on the theoretical blade, the least-squares superposition function corresponding to the following equation:

$$S(x) = \min \Sigma \text{Real Thickness}_x - \text{Theoretical Thickness}_x$$

where "Real Thickness$_x$" is the thickness of the real blade at a position x along the camber line of the real blade, "Theoretical Thickness$_x$" is the thickness of the theoretical blade at the same position x along the camber line of the theoretical blade, "min" is a minimum function, and S(x) is a difference for each position x along the camber line.

2. The method of fabricating a blade for an aircraft turbine engine, the method comprising molding a real blade, performing a verification method according to claim 1 for verifying whether the aerodynamic profile of the real blade complies with a theoretical blade, and machining the real blade if the blade is considered as being in compliance at the end of said verification method.

* * * * *